United States Patent [19]

Tanaka

[11] 4,113,200

[45] Sep. 12, 1978

[54] SAFETY BELT RETRACTOR WITH CONJUGATE RETURN SPRING MEANS

[75] Inventor: Akira Tanaka, Northridge, Calif.

[73] Assignee: American Safety Equipment Corporation, Encino, Calif.

[21] Appl. No.: 701,504

[22] Filed: Jul. 1, 1976

[51] Int. Cl.[2] .................. A62B 35/02; B65H 75/48
[52] U.S. Cl. .............................. 242/107; 242/107.4 R
[58] Field of Search .......................... 242/107–107.7; 185/9–14, 37, 39; 280/744–747; 297/388

[56] References Cited

U.S. PATENT DOCUMENTS

| | | | |
|---|---|---|---|
| 3,880,364 | 4/1975 | Andres | 242/107.4 R |
| 3,957,283 | 5/1976 | Pocobello | 242/107.4 R X |
| 3,984,063 | 10/1976 | Knieriemen | 242/107.4 R X |

Primary Examiner—Harvey C. Hornsby
Assistant Examiner—John M. Jillions
Attorney, Agent, or Firm—Poms, Smith, Lande & Glenny

[57] ABSTRACT

A safety belt retractor has a belt storage reel biased toward belt wound condition by conjugate return spring means comprising a first biasing spring connected to the reel for biasing said reel at a relatively low level for comfort zone torque rewind mode, a second biasing means for biasing the reel toward a belt wound condition independently of the first biasing means and means for releasably connecting the second biasing means to the reel whereby the reel is normally biased toward belt wound condition under the urging of both the first and second biasing means, but on releasing said second biasing means from said reel, the reel is biased to belt wound condition under the relatively low rewind torque of the first biasing means.

5 Claims, 10 Drawing Figures

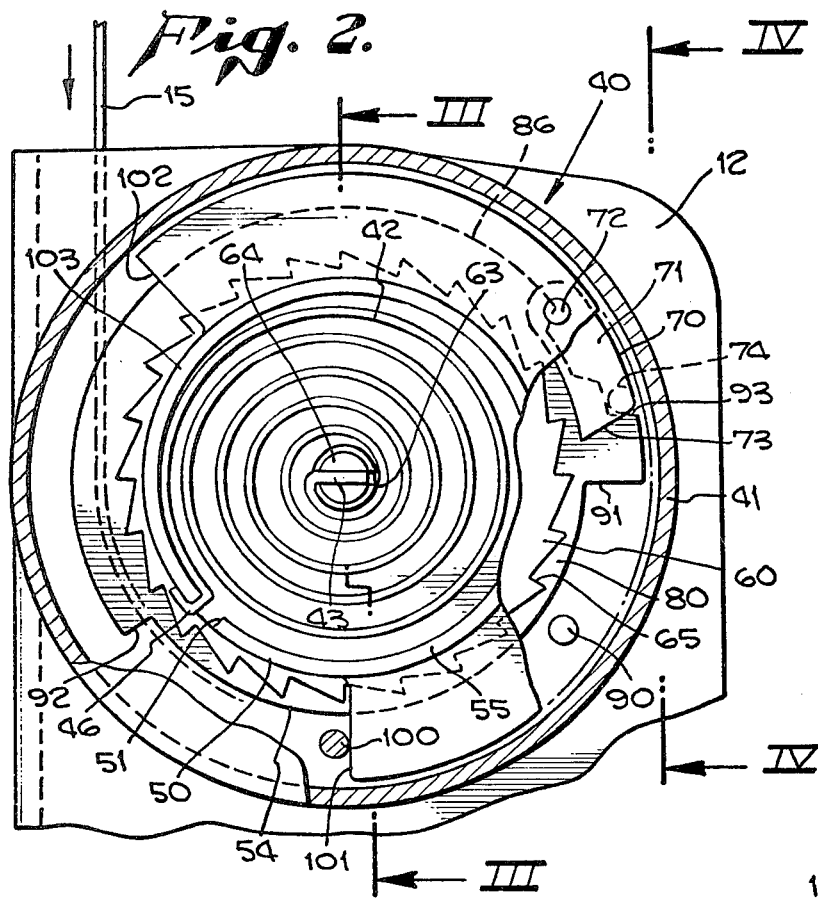
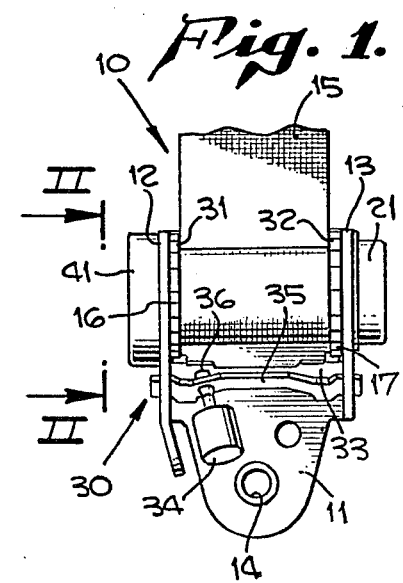
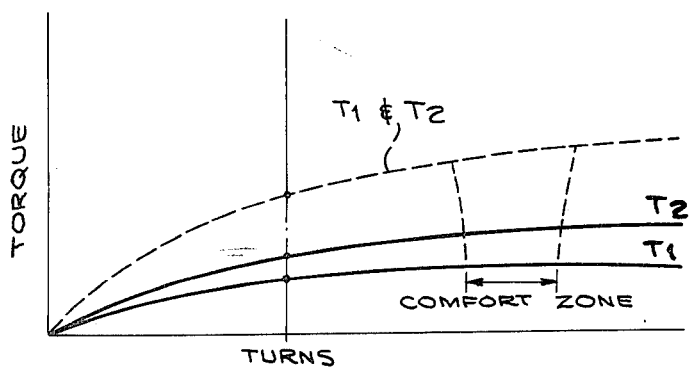

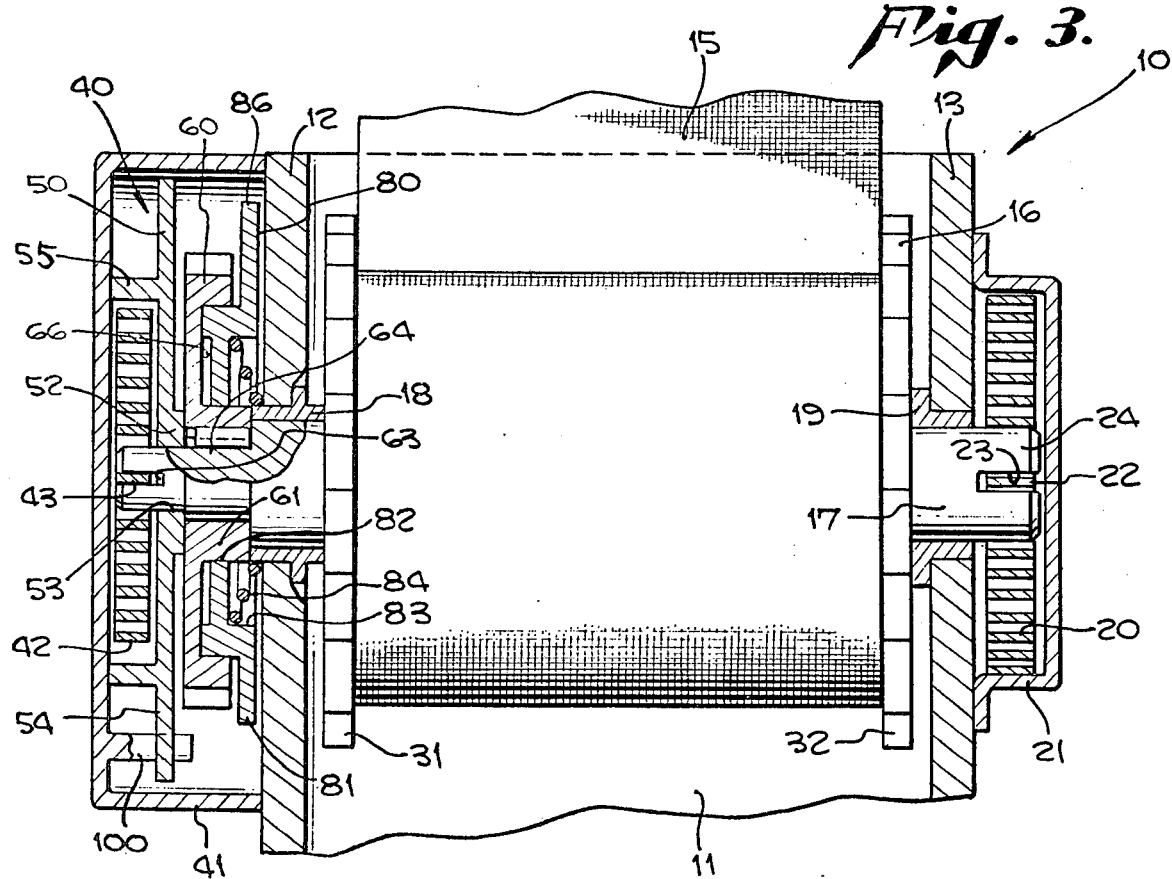
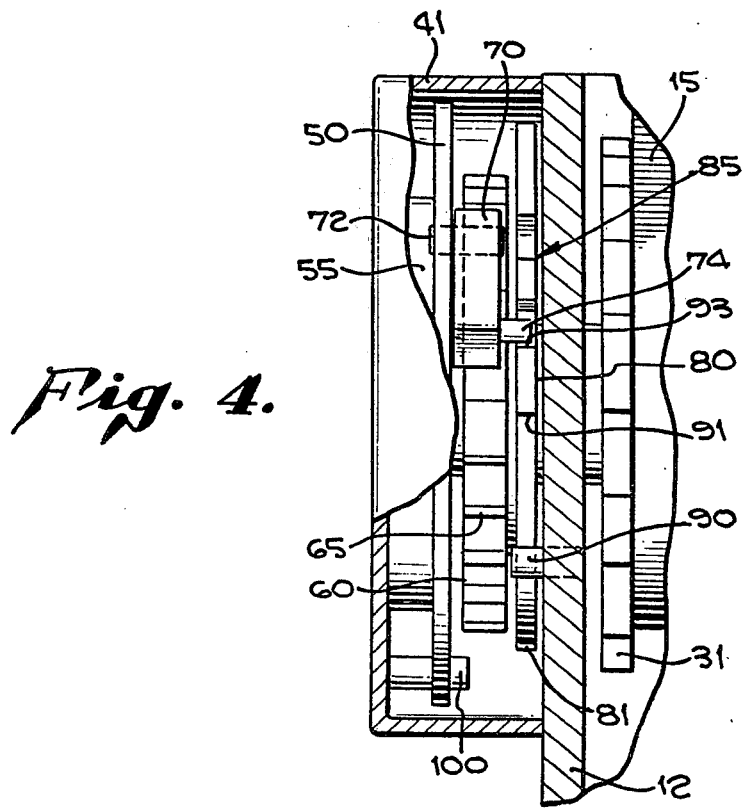

SAFETY BELT RETRACTOR WITH CONJUGATE RETURN SPRING MEANS

BACKGROUND OF THE INVENTION

This invention relates in general to emergency locking safety belt retractors and more specifically to such retractors employing means for reducing the belt tension in the safety belt during use by the operator to produce what is commonly called a "low tension zone", a zone of belt movement during use by the occupant when the rewind bias on the belt storage reel is relieved or reduced.

In prior art safety belt retractors, as in U.S. Pat. No. 3,834,646 (Heath) the belt tension is completely relieved by means activated by belt manipulation to hold the belt storage reel against retraction. However, it has been found that in some instances it is desirable to have a low tension rewind bias applied to the belt during the so-called "low tension zone" use of the belt so that it will have a rewind bias which can be utilized for deactivating the low tension producing means and provide for a full tension rewinding effect upon merely allowing the belt to retract or rewind naturally. One such improvement is disclosed in my copending application, U.S. Ser. No. 680,111 filed Apr. 26, 1976 now U.S. Pat. No. 4,026,494 in which I disclose a means for providing a low-tension zone effect through the provision of a counterbiasing spring. In that application disclosure, the normally provided retractor rewind spring is selectively counteracted upon by a counterbiasing spring to produce the low-tension zone mode. I have recognized that it would be desirable to produce such a low-tension zone mode of operation for a retractor employing spring means which act together, or independently of one another, as opposed to the counterbiasing effect of my prior invention.

SUMMARY OF THE INVENTION

It is therefore the primary object of the present invention to disclose and provide an improvement in safety belt tension reducing means for emergency locking retractors wherein the belt tension reducing means comprises a conjugate return spring means which is more economically and simply incorporated into emergency locking retractors than has been achieved in prior tension relieving and tension reducing means for such retractors.

It is a further object of the present invention to disclose and provide an improvement in such belt tension reducing means which is effectively operable to reduce seat belt tension when activated on a simple manipulation of the seat belt independently of and without effecting the otherwise normal movement of the belt and associated storage reel during operation of the retractor.

Generally stated, the within invention includes the provision of conjugate return spring means in an emergency locking safety retractor comprising two individual rewind springs for independently biasing the belt storage reel toward a belt wound condition and means for selectively blocking out the bias of one of said two rewind springs to provide a reduced or "low tension zone" rewind bias on said belt by the spring means. Preferably, the means for selectively blocking out the bias of one of said two rewind springs comprises means operated by a slight retractive movement of said belt following an initial unwinding movement of the belt to place it into a position of general use. More specifically, a first biasing means is connected to the reel for biasing the reel at a relatively low level of belt tension toward a belt wound condition to provide a comfort zone tensioning of the belt when the first biasing means only is operating on the reel. A second biasing means is provided for adding an additional rewind torque for normally winding the belt to wound condition, this second biasing means acting independently of the first biasing means and being releasably connectable to the reel. The rewind torque of the second biasing means is preferably larger than the rewinding torque of the first biasing means. A desirably high level of rewind torque may therefore be applied to the reel by the two biasing means operating as a conjugate return spring means and, on a selective manipulation of the belt, preferably a slight retraction movement following a protraction thereof, the higher torque producing second biasing means may be deactivated leaving the lower level comfort zone producing torque of the first biasing means only tending to cause a rewind of the belt. Importantly, according to the present invention, rewinding of the belt storage reel under the low tension of the first biasing means beyond a predetermined limited amount causes activation of the second biasing means to cause the two spring biasing means to operate in unison to provide the desired high level torque rewind for the belt.

A more complete understanding of the present improvement in emergency locking safety belt retractor with conjugate return spring means will be afforded to those skilled in the art from a consideration of the following detailed description of a preferred exemplary embodiment thereof. Reference will be made to the appended sheets of drawings which will first be described briefly.

BRIEF DESCRIPTION OF THE DRAWINGS

FIG. 1 is an elevational view of an exemplary embodiment of emergency locking safety belt retractor incorporating a preferred exemplary embodiment of conjugate rewind spring means for producing the belt tension reducing effect of the present invention;

FIG. 2 is an enlarged side detail view, partially in section, of the retractor of FIG. 1 taken variant along the plane II — II;

FIG. 3 is a vertical section view of the retractor of FIGS. 1 and 2 taken along the plane III — III in FIG. 2;

FIG. 4 is a detailed side view, partially in section, of the retractor of FIG. 2 taken along the plane IV - IV;

FIG. 10 is a graphical representation of the magnitude of torque applied by the first spring means $T_1$ and the second spring means $T_2$ for increasing numbers of turns of the belt storage reel during winding and unwinding movement thereof.

DETAILED DESCRIPTION OF THE PREFERRED EXEMPLARY EMBODIMENT

Figure 5:
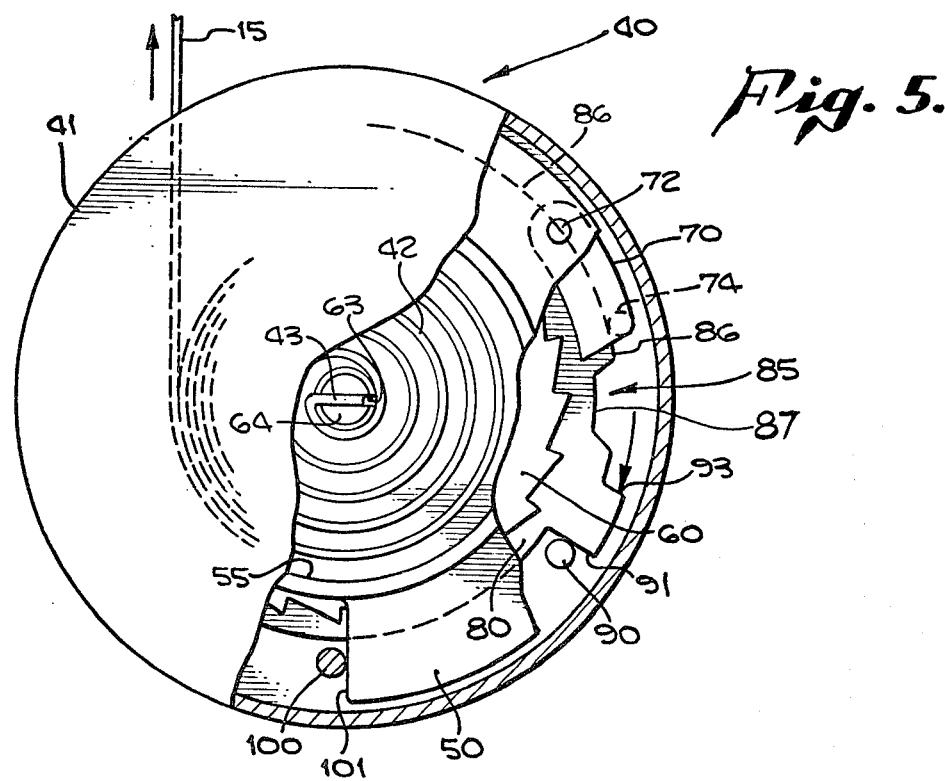
FIG. 5 is view of the retractor generally as in FIG. 2 showing an initial unwinding of the safety belt.

An exemplary embodiment of emergency locking safety belt retractor, indicated generally at 10, is illustrated in FIG. 1 in which the present improvement in conjugate return spring means may be used in accordance with the present invention for producing a reduced belt tension or comfort zone for the safety belt when in use. It should be understood that other types of retractors may employ the present invention in conjugate return spring means and that the retractor illustrated generally at 10 in FIG. 1 is exemplary only.

The exemplary retractor includes a conventional U-shaped frame including a base 11 with a pair of spaced side walls 12 and 13. An aperture 14 is provided in base 11 to facilitate bolting the retractor to a location of use in a vehicle in which the retractor is to be employed. The safety belt 15 is provided in conventional manner on a reel or drum 16 having a shaft 17, as seen in FIG. 3, journaled by appropriate bushings 18 and 19 to retractor sidewalls 12 and 13.

As is particularly contemplated within the present invention, the belt storage reel 16 is biased toward a wound or belt retracted condition by conjugate return spring means comprising two individual rewind springs for independently biasing the reel toward a belt wound condition and means for selectively blocking out the bias of one of the two rewind springs to provide a reduced rewind bias as will be subsequently explained. As seen in FIG. 3, one of such two rewind springs comprises a first biasing spring 20 provided in otherwise conventional manner within housing 21 on retractor sidewall 13 with an outer end fixed to the housing and an inner end 22 fitted within slot 23 in the right hand end 24 of reel shaft 17. Normally, such rewind spring provides the total required torque for causing a rewind of the webbing. According to the present invention, spring 20 is provided with a relatively lower rewind bias or torque of an amount which is to be desired for producing the rewind torque when the retractor is operating in a low tension mode as hereinafter explained.

The exemplary locking means for preventing belt protraction in the event of an emergency condition is indicated generally at 30. The retractor reel is provided with a pair of ratchets 31 and 32 with which a locking pawl 33 is adopted to interengage and lock the retractor against further webbing protraction when activated by an appropriate emergency responsive means. In the exemplary embodiment, such last means comprises an inertia sensor pendulum 34 suspended from support bar 35 with a head portion thereof (not shown) underlying a portion 36 of locking pawl 33 such that the locking pawl 33 is pivoted on sidewalls 12 and 13 into locking engagement with the rachets 31 and 32 upon swinging movement of pendulum 34. A more detailed description of this type of locking means may be found in U.S. Pat. No. 3,889,898, disclosure of which is incorporated herein by reference.

Referring now to FIGS. 2 and 3, the second biasing means of the aforementioned conjugate return spring means and the means for selectively blocking out the bias thereof, such means being indicated generally at 40 in FIG. 3, will now be explained in detail. The second biasing means, provided within housing 41, includes coil spring 42 having an inner end 43 held in slot 63 of reel shaft extension 64 which is formed integrally of shaft 17. An outer end 46 of spring 42, as best seen in FIG. 2, is secured to pawl carrier 50 via slot 51.

Pawl carrier 50 comprises an inner hub portion 52 having a central aperture 53 by which carrier 50 is rotatably mounted on reel shaft extension 64. As best seen in FIG. 3, carrier 50 has a disc-like body 54 and an integrally formed laterally extending annular boss 55. The second biasing spring 42 is positioned within the cavity formed within boss 55 adjacent the inner surface of housing 41 and applies a rewinding torque between reel shaft extension 64 and carrier 50. Pawl carrier 50 is thus normally biased about its rotative mounting on shaft extension 64 in a clockwise direction when viewed in FIG. 2 placing carrier 50 into abutting relation with stop pin 100 through its cam face 101. With carrier means 50 abutting pin 100, and thus held stationary, the bias of second biasing spring 42 tends to bias the reel in a rewind direction, or counterclockwise in FIG. 2.

Referring now to FIG. 10, there is illustrated a graphical representation of the magnitude of torque preferably provided by the aforementioned first and second spring biasing means. As stated hereinbefore, while spring 20 is provided in otherwise conventional manner, according to the present invention, it is provided in the form of a smaller coil spring than is normal in order to provide a lower, low tension zone producing, torque during winding of the reel as illustrated in the graph of FIG. 10 by the line $T_1$. The vertical line above the word "turns" in FIG. 10 represents a 0 number of turns for the retractor, that is a fully wound condition. The rewind springs are preloaded when installed and thus present a substantially constant level of torque during unwinding of the reel as shown by the substantially horizontal configuration of the line $T_1$. The torque produced by the second biasing spring 42 is illustrated on the graph of FIG. 10 by the line $T_2$. Again, the torque of this second spring means is substantially constant in magnitude over the winding or rewinding of the reel. Preferably, the torque of spring 42 is somewhat higher than that of the relatively low level of torque for the first spring means so that when both spring means are operating upon the reel, the summation of the torques thereof represented by the phantom line $T_1$ & $T_2$ will equal, or perhaps even exceed, the level of torque normally desired for effecting a rewind of a conventional safety belt retractor.

As is particularly contemplated within the present invention, one of the two rewind springs of the conjugate spring means of the present invention may be blocked out to produce a comfort zone effect for the safety belt when in use. As seen in FIG. 10, by selectively blocking out the biasing effect of the second biasing spring means, represented by the line $T_2$, the torque applied by this spring means upon the reel may be selectively reduced from the magnitude of belt tension produced by the spring torque of the two springs, line $T_1$ & $T_2$, to the substantially lower level of belt tension produced by the lower spring torque of the single biasing means, as exemplified by line $T_1$ in FIG. 10. The exemplary embodiment of such means for selectively blocking out the bias of one of said two rewind springs to provide a desired reduced rewind bias on the reel and thus on the belt will now be explained.

As explained hereinbefore, and as seen in FIG. 2, when the reel is in a fully wound condition the pawl carrier 50 abutts stop 100 and the aforedescribed second biasing spring 42 acts to bias reel 16 in a rewind direction. Means are provided in accordance with the present invention for blocking out the effect of spring 42 by selectively interconnecting the pawl carrier 50 with the reel shaft to prevent the relative biasing therebetween otherwise produced by spring 42. Means are provided for releasably connecting carrier 50 to reel 16 in the exemplary embodiment and include the provision of ratchet means 60 and pawl means 70 mounted upon carrier 50.

Ratchet means 60 is connected to reel 16, for rotation therewith by a conventional spline and groove interconnection between ratchet hub 61 and shaft extension 64 as seen in FIG. 3. Ratchet means 60 is further provided with ratchet teeth 65 which face in the direction of movement of the reel during a rewind rotation thereof as seen in FIG. 2.

Pawl means 70 as seen in FIG. 2 comprises a body 71 pivotally mounted at one end on a pivot pin 72 which is secured to pawl carrier means 50. An opposite free end of body 71 is provided with pawl tooth 73 adapted to engage with the individual teeth 64 of ratchet means 60 when allowed to do so as hereinafter explained. When pawl means 70 engages ratchet means 60, pawl carrier 50 is interconnected to reel 16 and thus shaft extension 64 deactivating spring 42.

Pawl deactivating means are provided in accordance with the present invention for normally preventing pawl means 70 from engaging teeth 64 of ratchet means 60 during normal winding and unwinding of webbing 15 as is required to protract it to a position of use and subsequently retract it to a position of storage. In the exemplary embodiment, such pawl deactivating means comprises the provision of a frictionally driven cam disc 80 having camming means for holding pawl means 70 in a deactivated position until it is desired that the pawl means be allowed to interlock with ratchet means 60. As seen in FIG. 3, the exemplary cam disc 80 comprises a body portion 81 having a central aperture 82 by which it is freely rotatably mounted about hub 61 of ratchet means 60. Disc body 81 has a rear annular recess 83 into which a compression spring 84 is fitted, an inner end of spring 84 abutting retractor side wall 12 about bushing 18. Cam disc 80 is biased by spring 84 against an inner side surface 66 of ratchet means 60 to be frictionally driven in either rotative direction in response to like movement of ratchet means 60 which is connected to reel 16. As seen in FIGS. 2 and 5, cam disc 80 has camming means, indicated generally at 85, for cooperating with a cam follower pin 74 provided on pawl means 70 to control positioning of pawl means 70 relative to ratchet means 60 in response to belt movement as hereinafter explained. Preliminary thereto, it should be observed that the rotative travel of cam disc 80 under the frictional drive of ratchet means 60 is limited by disc limit pin 90 which is adapted to be abutted by disc stop surfaces 91 and 92, respectively, formed in a relieved arcuate portion of disc 80. Also, the rotative travel of pawl carrier means 50 is also limited by pawl carrier stop 100 which is positioned to be abutted by pawl carrier stop faces 101 and 102, respectively, formed in a recessed arcuate portion 103 of the pawl carrier means. Limit stop 100 may be formed integrally of housing 41, as seen in FIG. 3 while limit pin 90 may be mounted to the retractor side wall 12 as seen in FIG. 4.

Mode of Operation

Upon an initial protraction or unwinding of webbing 15 from the retractor reel, as illustrated in FIG. 5, the clockwise rotation of ratchet means 60, as viewed in FIG. 5, frictionally drives cam disc 80 in a clockwise direction until stop face 91 abuts stop pin 90. Such movement of cam disc 80 places cam surface 86 beneath cam follower pin 74 to hold pawl means deactivated during further unwinding or protraction of the webbing into a position of use. During this initial protraction of the webbing, when pawl means 70 is deactivated, the clockwise bias of spring means 42 upon pawl carrier means 50 causes it to be retained against stop pin 100 as seen in FIG. 5 and both springs 20 and 42 are acting to bias the reel toward rewind condition.

Figure 6:
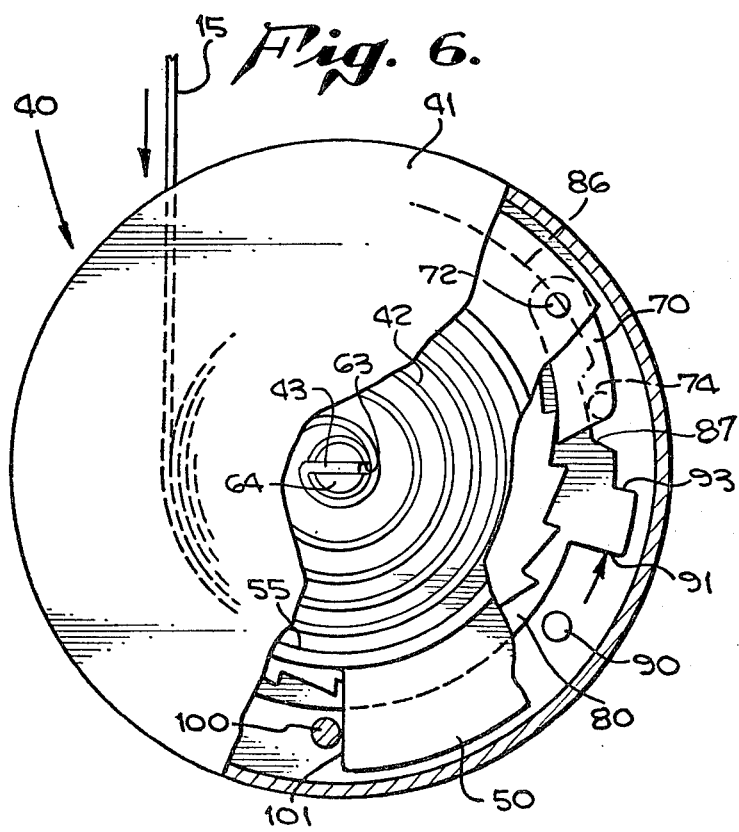
FIG. 6 is a view as in FIG. 5 showing the effect of an initial retraction movement of the belt following the unwinding or protraction movement of FIG. 5.
Figure 7:
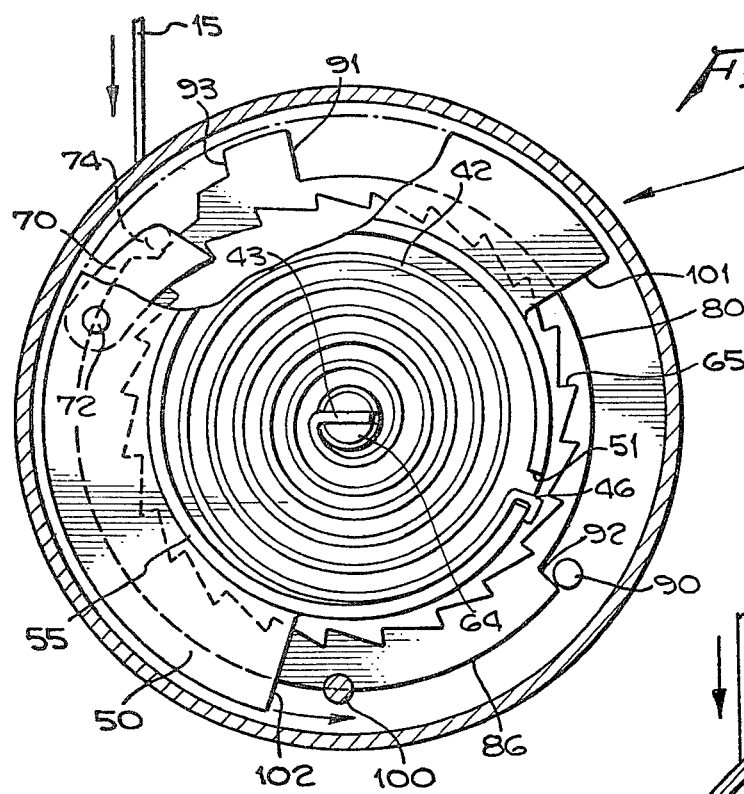
FIG. 7 is a view as in FIG. 6 showing the effect of a still further rewind or retraction movement of the belt within a predetermined limited extent producing a low-tension mode for the belt.

After the seat belt has been protracted to a position of intended use, a slight retraction movement of the webbing, as illustrated in FIG. 6, causes a counterclockwise rotation of cam disc 80, under the influence of the aforedescribed friction drive from ratchet means 60, to place the recessed cam surface 87 of the camming means, indicated generally at 85, beneath pawl means 70 which allows the latter to pivot about its mounting pin 72 into engagement with ratchet means 60. On a still further retraction of webbing 15 under the influence of rewind spring 20, pawl means tooth 73 engages against the aligned tooth of ratchet means teeth 65, as seen in FIG. 7, to interconnect the reel 16 to the pawl carrier 50 and block out the second spring biasing means 42. The resultant effect on the belt tension felt by the passenger is thus a reduced tension due only to the first low tension biasing of spring 20.

Figure 9:
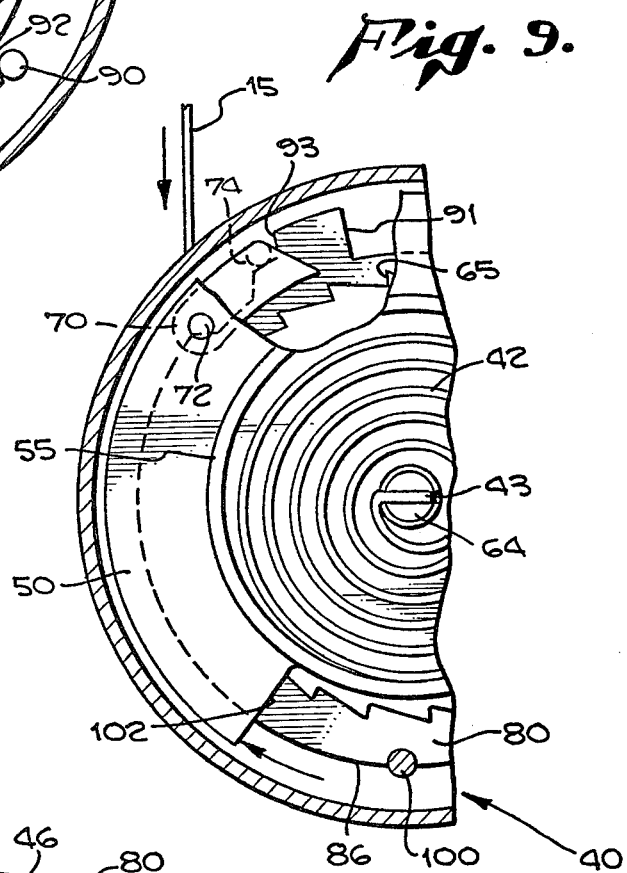
FIG. 9 is a view as in FIG. 8 showing the rewinding or retractive movement of the safety belt toward a full rewind or wound condition for the safety belt as seen in FIG. 2.
Figure 8:
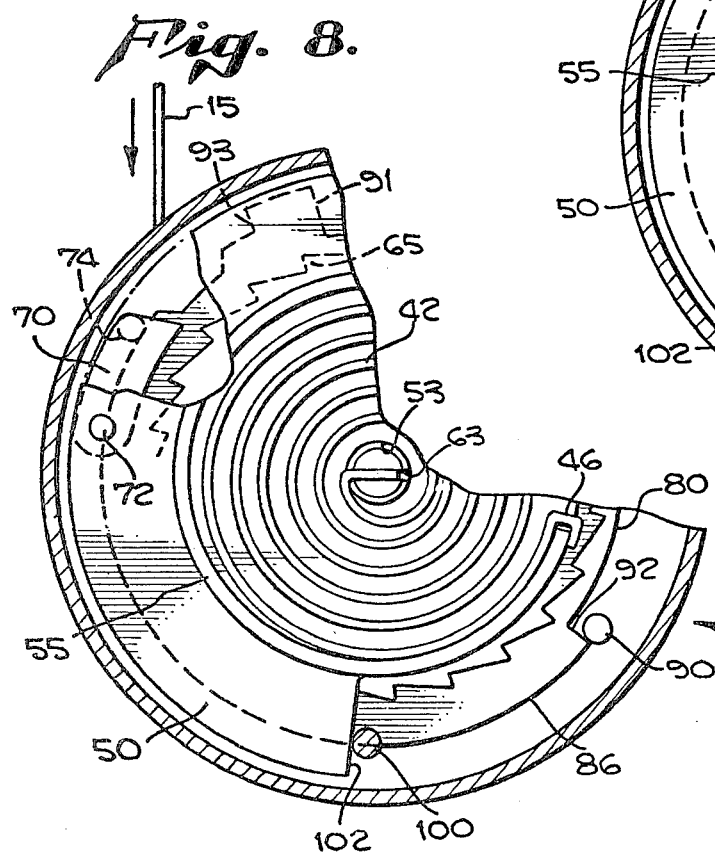
FIG. 8 is a view as in FIG. 7 showing the effect of a belt rewinding or retraction movement beyond the limited extent of a low-tension travel or movement for the belt.

The low tension zone made of reduced belt tension of the present invention thus described occurs for only a limited extent of belt retractive movement as indicated by the reel movement from the position of FIG. 6 to that of FIG. 8. On the beginning of the initial retracted motion of webbing 15 in FIG. 6, cam disc 80 moves initially to place recessed cam surface 87 beneath the pawl follower 74 and then continues in counterclockwise movement on further belt retraction until disc stop face 92 abuts stop pin 90, as seen in FIG. 7. On still further belt retraction, as seen in FIG. 8, and with cam disc 80 held stationary by pin 90, continued counterclockwise rotation of ratchet means 60 drives pawl carrier means 50 counterclockwise from the position of FIG. 7 to that of FIG. 8 whereby pawl means 70 is disengaged from the ratchet means due to the pawl follower pin 74 riding up upon disc camming surface 86. Pin 100 limits any further counterclockwise rotation of pawl carrier means 50 as would otherwise occur. The tension reducing means is thus deactivated and the pawl carrier means is turned clockwise under the influence of counter balance spring 42, as illustrated in FIG. 9 with pawl follower pin 74 passing over the recessed portion of the disc camming means until it engages against disc stop surface 93. The force of counterbalance spring 42 on pawl carrier means 50 causes the latter to continue its clockwise rotation when viewed in FIG. 9 to carry cam disc 80 along with it back to the position of FIG. 2 wherein carrier means stop face 101 engages against stop pin 100. The return of the pawl carrier 50 position of FIG. 2 causes the spring bias of spring 42 to be reapplied to reel 16 to produce a full rewind of the belt.

From the foregoing, it can be seen by those skilled in the art that an improvement in safety belt retractor having conjugate return spring means to provide a belt tension reducing means has been disclosed and provided by the within preferred exemplary emergency locking retractor. The vehicle passenger may manipulate the safety belt 15 in normal manner to place the belt in use without the need for special manipulation of the belt to deactivate the second spring of the conjugate spring means. Further, the present tension reducing means, by its construction and mode of operation, provides for a more simple and economical accomplishment of the aforestated objects than heretofore attainable with prior art belt tension reducing means. It should be understood by those skilled in the art that various modifications, adaptations and alterations thereof may be made within the spirit and scope of the present invention which is defined by the following claims.

I claim:

1. In a safety belt retractor having a belt storage reel including a reel shaft, first and second biasing means for biasing said reel toward a belt wound condition and means for selectively blocking out the bias of one of said first and second biasing means operable in response to a slight reel rewinding rotation to provide a reduced rewind bias on said reel, the improvement in said means for selectively blocking comprising the provision of:

ratchet means connected to said reel for rotation therewith and having ratchet teeth facing in the reel rewind direction;

pawl means for engaging said ratchet teeth; and pawl carrier means rotatably mounted on said retractor and mounting said pawl means for movement on said carrier relative to said ratchet teeth between ratchet teeth engaging and non-engaging positions, and wherein said one of said first and second biasing means comprises a spring having one end connected to said reel shaft and an opposite end connected to said pawl carrier means whereby the bias of said one of said first and second biasing means is blocked when said pawl means is in said ratchet teeth engaging position.

2. The improvement in safety belt retractor of claim 2 further comprising the provision of a stop member on said retractor and means on said pawl carrier means for abutting said stop member when said belt is being protracted and retracted with said blocking means in a released condition.

3. The improvement in safety belt retractor of claim 2 wherein said blocking means comprises:

pawl deactivating means for normally preventing said pawl means from engaging teeth of said ratchet means during winding and unwinding of said belt, said pawl deactivating means including means operable upon a rewinding movement of a predetermined limited extent of said belt when the latter has been previously unwound to a position of use for allowing said pawl means to engage with said teeth of said ratchet means.

4. In a safety belt retractor having a frame, a reel rotatably journaled on said frame, a safety belt wound on said reel, dual biasing means for applying either of two selectable amounts of biasing on said spool in a belt rewind direction and means operable in response to a slight spool retraction rotation for selecting the lower one of said selectable amounts of biasing, the improvement in said last-named means comprising the provision of:

ratchet means connected to said reel for rotation therewith and having a plurality of ratchet teeth facing in the reel rewind direction;

pawl means for engaging said ratchet teeth; and pawl carrier means rotatably mounted on said retractor and mounting said pawl means for movement on said carrier relative to said ratchet teeth between ratchet teeth engaging and non-engaging positions, said pawl carrier means being connected to said dual biasing means for causing selection of said lower one of said selectable amounts of biasing when said pawl means is in the ratchet teeth engaging position.

5. The improvement in a safety belt retractor as in claim 2 further comprising:

pawl deactivating means for normally preventing said pawl means from engaging teeth of said ratchet means during winding and unwinding of said belt, said pawl deactivating means being operable upon a sight rewinding movement of said belt when the latter has been previously unwound to a position of use to allow said pawl means to engage with said teeth of said ratchet means.

* * * * *